United States Patent [19]

Moritz et al.

[11] 4,328,100

[45] May 4, 1982

[54] FILTER DEVICE WITH A CHAMBER, A HELICOIDALLY CONFORMED SUPPORT AND A FILTER RETAINED BY THE SUPPORT

[75] Inventors: Eugen Moritz; Christian Moritz, both of Riehen, Switzerland

[73] Assignee: Filtroba AG, Basel, Switzerland

[21] Appl. No.: 135,510

[22] Filed: Mar. 31, 1980

[30] Foreign Application Priority Data

Apr. 4, 1979 [CH] Switzerland .................. 3105/79

[51] Int. Cl.³ ............................................ B01D 29/06
[52] U.S. Cl. .................................... 210/304; 210/346; 210/486; 210/497.1
[58] Field of Search ............... 34/164; 209/11, 362; 210/297, 304, 324, 331, 346, 398, 486, 487, 497.1, 497.01, 497.2, 512.1

[56] References Cited

U.S. PATENT DOCUMENTS

| | | | |
|---|---|---|---|
| 1,604,652 | 10/1926 | Manning | 210/331 X |
| 1,686,092 | 10/1928 | Manning | 210/331 X |
| 2,257,244 | 9/1941 | Oehler | 210/304 |
| 2,818,968 | 1/1958 | Carrier, Jr. | 209/362 X |
| 2,847,767 | 8/1958 | Carrier, Jr. | 34/164 |
| 3,137,652 | 6/1964 | Graue | 210/486 X |
| 3,282,825 | 11/1966 | Brown et al. | 204/180 P X |
| 3,768,658 | 10/1973 | Palma | 210/304 |
| 3,935,107 | 1/1976 | Yagishita | 210/243 |
| 4,169,533 | 10/1979 | Rubio | 209/11 |

FOREIGN PATENT DOCUMENTS

| | | | |
|---|---|---|---|
| 836731 | 1/1939 | France . | |
| 6166 | 10/1921 | Netherlands | 210/331 |
| 467092 | 2/1969 | Switzerland . | |
| 803206 | 10/1958 | United Kingdom . | |
| 856172 | 12/1960 | United Kingdom | 210/487 |
| 634758 | 11/1978 | U.S.S.R. | 210/304 |

OTHER PUBLICATIONS

Koehler Bosshardt Spiral-Filter, 4 pp., 1976, Koehler Bosshardt AG Basel.

*Primary Examiner*—Robert H. Spitzer
*Attorney, Agent, or Firm*—Werner W. Kleeman

[57] ABSTRACT

A filter device exhibits a chamber with a spiral which revolves helicoidally about the chamber axis. The spiral is constituted by a channel-shaped support which holds taut a filter constituted by a spiral-shaped tube. During the filtration of a suspension the liquid component of the suspension passes through the filter into the channel-shaped support and from the latter to a filtrate outlet. Because at least that part of the filter effective for the filtration forms a substantially smooth fold-free surface, uniform utilization of the total effective surface of the filter is possible. The solid residue deposited upon the surface of the filter can also be transported out of the chamber without difficulty by rotating the spiral.

15 Claims, 6 Drawing Figures

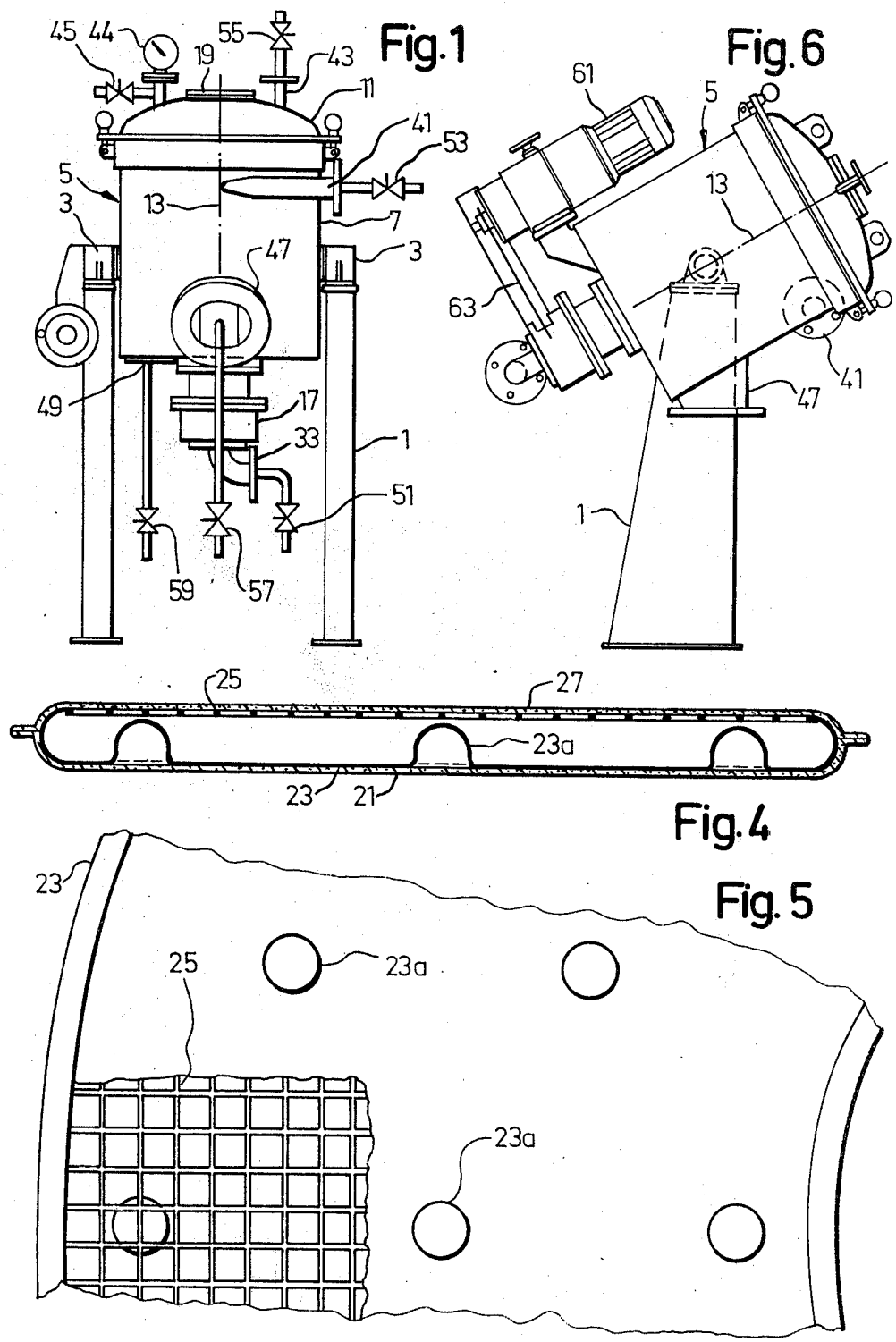

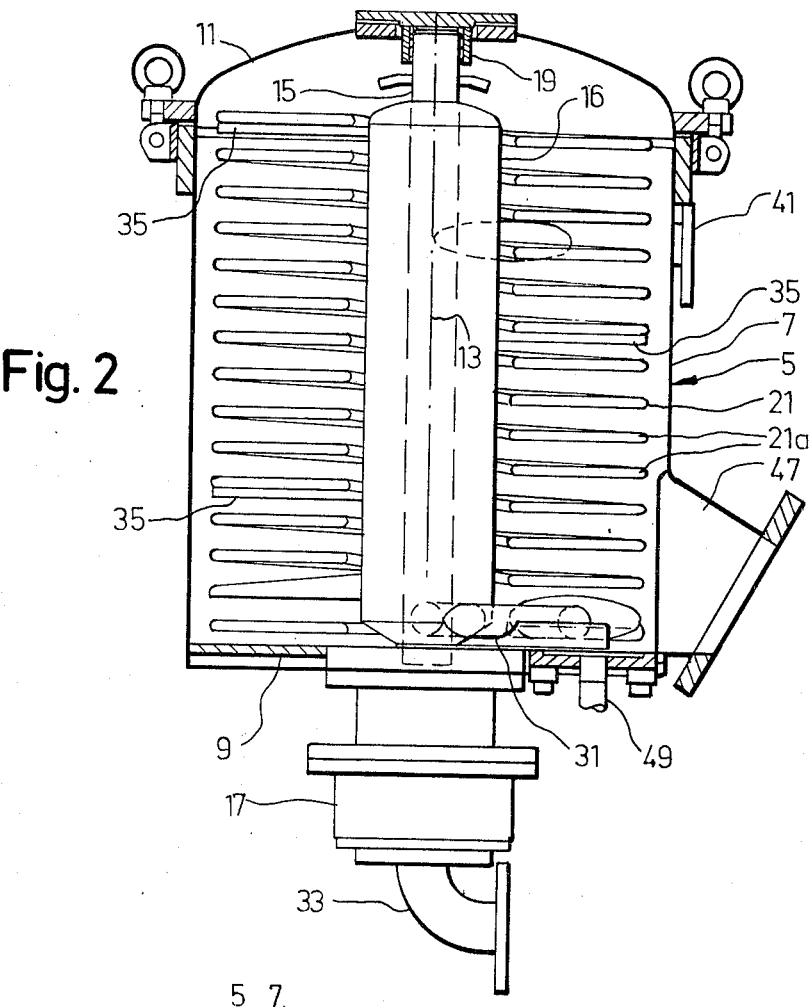
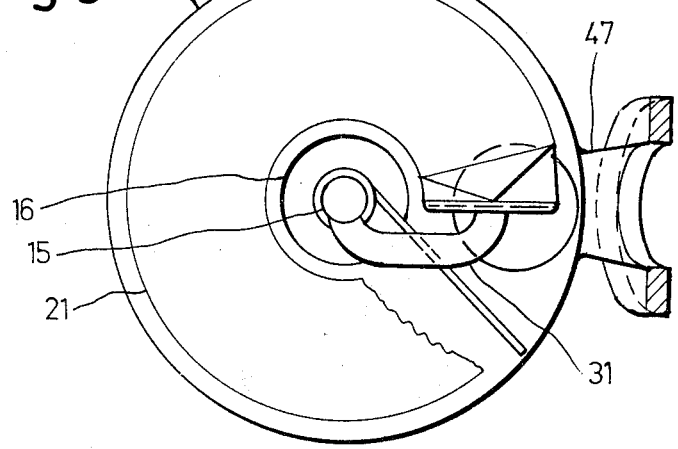

FILTER DEVICE WITH A CHAMBER, A HELICOIDALLY CONFORMED SUPPORT AND A FILTER RETAINED BY THE SUPPORT

BACKGROUND OF THE INVENTION

The invention relates to a filter device with a chamber with an inlet for the material to be filtered, a filtrate outlet and a residue outlet serving to discharge the retained residues, and a helicoidally conformed support arranged in the chamber, also a filter retained by said support.

A known filter device of this type exhibits a cylindrical chamber, in the axis of which a hollow rod is arranged, the cavity of which is connected to the outlet, and which is provided with holes distributed along its length. A support rod of solid circular cross-section, which revolves helicoidally around the hollow rod, is also present. An interstice is also present between consecutive convolutions of the helicoidally conformed support rod. Furthermore, an interstice is also present between the hollow rod located in the chamber axis and the convolutions of the helicoidally conformed support rod. The filter is constituted by a filter cloth. Said cloth originally exhibited the shape of a cylindrical tube. Said tube was then fitted over the support rod in the direction of the chamber axis. The tube was then constricted by a cord running helicoidally between the convolutions of the support rod so that it is drawn between the consecutive convolutions of the support rod against the hollow rod extending along the chamber axis. The filter cloth then forms a surface which resembles the external surface of a screw. But since the filter cloth is constricted between the convolutions of the support rod to a diameter which is considerably smaller than the diameter of the hose originally constituted by the filter cloth, folds extending more or less radially are produced in the filter cloth. The size of said folds increases from the circumference towards the hollow rod.

During operation the suspension to be filtered is introduced into the chamber. The liquid component of the suspension can then pass through the surface filter and the holes in the hollow rod into its cavity and through the latter to the filtrate outlet. The solids present in the suspension are retained on the surface of the filter cloth and must be removed from time to time.

However, said removal of the solids deposited upon the surface of the filter cloth is comparatively difficult because of the folds referred to. Said folds also have the result that an uneven distribution of the separated solids on the surface of the filter cloth is obtained. This increases the clogging frequency of the filter cloth, so that the relatively difficult removal of the solids is moreover necessary after comparatively short operating periods each time.

In many cases, particularly where the filtration is performed in order to recover the solid residue, it would be desirable to generate an overpressure in the chamber during the filtration by means of a pressurized gas. This however is practically impossible with the filter previously known because the screw convolutions formed by the filter otherwise become considerably compressed.

SUMMARY AND OBJECTS OF THE INVENTION

The invention now adopts the aim to develop a filter device in which the disadvantages mentioned can be avoided.

This aim is achieved by a filter device of the type initially defined, wherein according to the invention the filter device is characterized by a chamber with an inlet for the material to be filtered, a filtrate outlet and a residue outlet for discharging the retained residues, a helicoidally conformed support arranged in the chamber, and a filter retained by said support, comprising a rotatable hollow spiral, delimited conjointly by said support and said filter, said spiral having a helicoidal passage connected to said filtrate outlet, said filter having sections forming consecutive convolutions of said spiral, and said sections being totally mutually separated by an interstice which passes through the axis of rotational symmetry of said spiral in said chamber. Further advantageous developments of the invention will emerge from the subordinate claims.

BRIEF DESCRIPTION OF THE DRAWINGS

The invention will now be explained with reference to an exemplary embodiment illustrated in the accompanying drawing, wherein:

FIG. 1 shows an elevation of a filter device,

FIG. 2 shows a section made along the axis of the chamber of the filter device, on a larger scale, FIG. 3 shows a cross-section through the chamber, namely above the lowest convolution of the spiral constituted by a support and the surface filter, on the same scale as FIG. 2, FIG. 4 shows a section passing transversely to the helix along which the spiral extends, through a convolution of the spiral, on a still larger scale, FIG. 5 shows a plan of a section of the spiral-shaped support without the filter, and FIG. 6 shows a side elevation of the filter device with the chamber in a tilted position.

DETAILED DESCRIPTION OF THE PREFERRED EMBODIMENT

The filter device for filtering liquids with suspended solids illustrated in FIG. 1 exhibits a frame 1 with two columns, between which a chamber 5 is retained tiltably about a horizontal axis by means of bearings 3. Said chamber 5, which may be seen particularly clearly in FIG. 2, exhibits a circular cylindrical envelope 7 and is closed at the bottom by a base 9 welded to it, and at the top by a detachably secured domed cover 11. A hollow shaft 15 extending along the axis of rotational symmetry 13 of the chamber and provided in the central section with an envelope 16 is mounted rotatably by means of fluid-tight bearings 17, 19 in the base 9 and cover 11 respectively of the chamber 5.

A hollow spiral 21 is arranged in the chamber 5 and forms a helix about the axis 13. The spiral 21 exhibits a support 23 which may be seen particularly clearly in FIGS. 4 and 5, which is constituted by a channel made of sheet metal, open at the top and having a base and semicircular walls. The base of the support 23 is provided with rounded pressed-up depressions 23a or grooves which are distributed across the base of the support. A grill 25 is also attached to the top rim of the support 23; it extends across the region of the channel aperture and may be braced by the depressions 23a. The support 23 is covered by a likewise spiral-shaped tube which is made of cloth and constitutes a surface filter 27 braced by the grill 25 and permeable to the liquid to be filtered. Said surface filter has pores, the inside width of which is smaller than that of the meshes of the grill 25 and is constructed so that it covers the support 23 substantially fold-free, so that at least that part of the filter masking the aperture of the channel-shaped support 23 constitutes a practically smooth surface. The filter 27 is maintained tensioned by the support 23 without any particular securing means or seal elements being necessary at the longitudinal edges of the channel-shaped support. Only the two ends of the tubular filter are preferably secured against displacement. For this purpose, e.g., the lower end of the filter may be clamped detachably and fluid-tightly to the support by a shackle or other retaining member, and the upper end of the tubular filter may either be clamped in a corresponding manner and/or closed so that it is self-retaining at the free end of the support.

As may be seen from FIG. 2, a free slit-shaped interstice or space is present between the inner edges of the convolutions 21a of the spiral 21 and the envelope 16 of the shaft 15 coaxial to the axis 13. Furthermore a small interstice is also present between the outer edges of the spiral 21 and the chamber envelope 7. Moreover the pitch of the spiral 21 is greater than the cross-sectional dimension of the spiral convolutions measured parallel to the axis 13, so that a free interstice or space is present between consecutive spiral convolutions 21a. The convolutions of the surface filter 27 belonging to the consecutive convolutions 21a of the spiral 21 therefore cohere only along a helix and are mutually separated by interstices in the section shown in FIG. 2. The lower end of the support 23 is attached by a connecting piece 31, which is visible particularly clearly in FIG. 3, to the hollow shaft 15. The cavity of the latter is connected to a filtrate outlet 33 attached to the base 9 of the chamber 5. The cavity of the spiral 21 is closed at the top and connected at the bottom by the connecting piece 31 and the cavity of the shaft 15 to the filtrate outlet 33 and therefore delimits a helicoidal passage for the filtrate. Arm-shaped stays 35, upon which the spiral 21 rests, are attached to the envelope 16 at different heights.

During production the support 23 is assembled from individual segments. The spiral-shaped tube constituting the surface filter 27 is likewise assembled during production from cloth segments forming its upper and lower halves. Said segments are then joined fluid-tightly together at their outer and inner edges and at their joint positions. The tube thus formed is then slid over the support 23 along the latter from above. It should also be mentioned that the mutually connected edges of the filter segments projecting slightly from the support 23, which are visible in FIG. 4, have not been shown in FIG. 1 for the sake of simplicity.

The chamber 5 exhibits in the upper section of the chamber envelope 7 an inlet 41 for the suspension to be filtered. The cover 11 is also provided with a connection 43 for a pressurised gas feed pipe. A manometer 44 and an overpressure valve 45 are likewise mounted on the cover. Immediately above the chamber base 9, the chamber envelope 7 is provided with a residue outlet 47. The base 9 is also provided with an additional outlet 49 for the remainder of the liquid present in the chamber, whilst the chamber base is also provided with a filter above the outlet 49. The filtrate outlet 33, the suspension inlet 41, the connection 43, the residue outlet 47 and the outlet 49 are each adapted for closing by a valve 51, 53, 55, 57, 59 indicated schematically in FIG. 1.

A motor 61, visible in FIG. 6, is also attached to the chamber 5; it is connected by a gear 63 to the shaft 15 and permits the latter to be rotated conjointly with the spiral 21.

The device may be used both for clarifying filtration, where the filtrate is recuperated as a useful product, and also for residue filtration, where the residue constitutes the useful product.

When the device is used for filtration, the chamber 5 is fixed in the position in which its axis 13 extends vertically. The shaft 15 and the spiral 21 are also stationary. Furthermore the valves 51 and 53 are open. The suspension to be filtered is now introduced through the inlet 41. The liquid present in the suspension then penetrates from above through the surface filter 27 into the channel-shaped support 23 and flows along the latter to the filtrate outlet 33. The solid particles contained in the suspension accumulate on that part of the surface filter 27 which masks the aperture of the support 23. Compressed air or pressurized nitrogen may be fed in through the connection 43 during the filtration process, whilst the grill 25 prevents the filter 27 from being forced into the channel-shaped support 21.

A solid residue therefore forms on the top surface of the surface filter, and must be removed from time to time. In order to remove said residue, the remaining liquid still present in the chamber 5 may first of all be drained through the outlet 49 and added to the filtrate. Then the chamber is tilted into the position illustrated in FIG. 6, in which the residue outlet 47 occupies approximately the lowest point of the chamber. The shaft 15 and the spiral 21 with the surface filter 27 are also rotated slowly about the axis 13. The residue present on the surface filter passes due to gravity and by the effect of the spiral 21 now acting as a transport screw, to the residue outlet 47 and can be removed through the latter and the valve 57, now open.

Because, as mentioned, the surface filter is substantially fold-free, the entire top surface of the surface filter is uniformly effective during the performance of a filtration. Due to the freedom of the surface filter from folds, the residue can be removed in the manner described without difficulty.

The areal surface filter, which segregates the solids substantially on its surface, may consist e.g., of a textile or metallic woven fabric or a felt. As described, the filter may be constituted by a tube which encloses the support in the section passing transversely to the helix along which the support extends visible in FIG. 4. However it would also be possible, to provide instead of a tubular, simply a band-shaped surface filter which only masks the upper open side of the channel-shaped support 23. Furthermore, instead of the grill 25 a perforated plate which exhibits passage orifices distributed across its surface may obviously also be provided.

A crank for manual rotation may also be provided instead of the motor 61. Particularly if the filter device is provided exclusively for clarifying filtration, a rotary mounting and a rotation of the spiral may be entirely omitted.

In order that, during the charging of the suspension to be filtered, no air bubbles which distend the filter can appear in the interior of the relatively airtight filter 27 due to the displacement of the air contained in the chamber 5, the chamber may be evacuated through the connection 43 or an additional connection before the suspension is charged.

But the cavity of the spiral 21 could also be closed at the lower end of the spiral, and instead of being connected there by the connecting piece 31, be connected by a connecting piece arranged at the upper end of the spiral to a filtrate outlet passing out of the chamber at the bottom or top. With this construction of the device the air can flow out successively through the cavity of the spiral and the valve in the filtrate outlet pipe, which is then opened during charging, during the charging of the suspension into the chamber. By this measure it can be insured without previous evacuation that no airlocks which might distend the filter develop in the interior of the filter during the charging of the suspension.

Furthermore the grill 25 serving as bracing member for the filter 27 need not be rigidly attached to the support 23, but may be constituted by a plurality of grill sections with edges bent downwards parallel to the side walls of the support 23, so that it is retained loosely by the latter. The individual grill sections may e.g., extend approximately over half a convolution of the spiral 21. Then, for the cleaning of the filter 27 and of the spiral 21, first the filter and then the individual grill sections may be slid along the support 23 and separated from the latter at its end.

We claim:

1. Filtering apparatus comprising a chamber with an inlet for the material to be filtered, a filtrate outlet and a residue outlet for discharging the retained residues, a helicoidally conformed support arranged in the chamber, and a filter retained by said support;

a central member connected at one end to said filtrate outlet and contained in said filter apparatus in such a manner that the filtrate passes through only the lower portion thereof;

a hollow helix delimited conjointly by said support and said filter, said helix having a wide helicoidal passage uninterruptedly extending throughout substantially the total helix and being connected at only one end of the helix to said filtrate outlet which allows said helix to be temporarily elastically elongated or compressed;

said helix forming consecutive convolutions about the axis of the helix;

said consecutive convolutions, in a section passing through and along said axis of the helix, being totally mutually spaced apart and;

said consecutive convolutions being, over at least a substantial part of the helix, in the said section free of any attachment to other solid parts of the apparatus all around their sectional circumference.

2. The filtering apparatus of claim 1, wherein said consecutive convolutions are mutually spaced apart in any section passing through and along said axis.

3. The filtering apparatus of claim 1, wherein said helix is attached to the other solid parts of the apparatus at most at its two ends.

4. The filtering apparatus of claim 1, wherein said helix is attached to the other solid parts of the apparatus exclusively at said end where said passage is connected to said filtrate outlet.

5. The filtering apparatus of claim 1, wherein said passage is connected with said filtrate outlet uniquely at said end of the helix.

6. The filtering apparatus of claim 1, wherein said filter comprises a flexible, helicoidal tube permeable to the liquid to be filtered and surrounds said support in said section along at least a substantial part of the helix.

7. The filtering apparatus of claim 6, wherein said tube uninterruptedly extends along substantially the entire length of the helix.

8. The filtering apparatus of claim 6 or 7, wherein said tube is dimensioned in such a way that it is spanned over its cross-section by the support and that it is mountable by pulling it along the helicoidal support; and the fastening of the tube to the support is at least substantially achieved by this spanning and said tube is secured against longitudinal displacements at its ends.

9. The filtering apparatus of claim 8, wherein the attachment of the tube to the support is achieved without separate fasteners except, at most, of fasteners arranged at the two ends of the tube.

10. The filtering apparatus of claim 1, wherein said central member extends along said axis through the helix, the support being connected with said central body at most at the two ends of the helix and being separated over the remaining main part of its length from the central member by a space.

11. The filtering apparatus according to claim 10, wherein said helix is connected with said central member at most at one of its ends.

12. The filtering apparatus of claims 10 or 11, wherein said central member and said chamber comprise means for rotatably journalling said support on at least one side of said helix.

13. The filtering apparatus of claim 12, wherein said central member comprises a shaft journalled on both sides of said helix.

14. The filtering apparatus of claim 1, wherein said support is formed by a channel open at its top side.

15. The filtering apparatus of claim 14, further including a bracing member extending over the region of the aperture of the channel and having orifices distributed across its surface.

* * * * *